United States Patent
Collins et al.

(10) Patent No.: US 10,417,611 B2
(45) Date of Patent: Sep. 17, 2019

(54) METHODS AND SYSTEMS FOR PROVIDING MULTIPLE COLUMN CUSTOM INDEXES IN A MULTI-TENANT DATABASE ENVIRONMENT

(75) Inventors: Jesse Collins, San Francisco, CA (US); Simon Y Wong, San Carlos, CA (US); Jaikumar Bathija, Freemont, CA (US); John F O'Brien, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 132 days.

(21) Appl. No.: 12/897,276

(22) Filed: Oct. 4, 2010

(65) Prior Publication Data
US 2011/0289091 A1   Nov. 24, 2011

Related U.S. Application Data

(60) Provisional application No. 61/345,883, filed on May 18, 2010.

(51) Int. Cl.
*G06F 7/00* (2006.01)
*G06Q 10/10* (2012.01)
*G06F 16/22* (2019.01)

(52) U.S. Cl.
CPC ......... *G06Q 10/10* (2013.01); *G06F 16/2228* (2019.01)

(58) Field of Classification Search
CPC .............................................. G06F 17/30312
USPC ....................... 707/687, 705, 802
See application file for complete search history.

(56) References Cited

U.S. PATENT DOCUMENTS

| | | | |
|---|---|---|---|
| 5,043,872 A | 8/1991 | Cheng et al. |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

FOREIGN PATENT DOCUMENTS

WO    2006076520 A3    2/2007

OTHER PUBLICATIONS

Final Office Action for U.S. Appl. No. 14/028,316 dated Feb. 21, 2018, 26 pages.

(Continued)

*Primary Examiner* — Eliyah S. Harper
(74) *Attorney, Agent, or Firm* — Jaffery, Watson, Mendonsa & Hamilton, LLP

(57) ABSTRACT

In accordance with embodiments, there are provided methods and systems for providing multiple column custom indexes in a multi-tenant database environment. A method embodiment provides defining a multi-tenant data structure having a plurality of data columns data fields and a plurality of rows for each of multiple tenants, each row including a data column for a tenant identifier, defining a first data field for a tenant, the first data field having a first data type, defining a second data field for the tenant, the second field having a second data type, and defining an index table including a tenant identifier for the tenant, a copy of data from the first data field and the second data field, and a key to the corresponding rows of the multi-tenant data structure.

20 Claims, 8 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,079 A | 2/1999 | Davis et al. |
| 5,873,096 A | 2/1999 | Lim et al. |
| 5,918,159 A | 6/1999 | Fomukong et al. |
| 5,963,953 A | 10/1999 | Cram et al. |
| 6,029,163 A | 2/2000 | Ziauddin |
| 6,092,083 A | 7/2000 | Brodersen et al. |
| 6,169,534 B1 | 1/2001 | Raffel et al. |
| 6,182,079 B1 | 1/2001 | Lenzie |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,178,425 B1 | 6/2001 | Brodersen et al. |
| 6,266,669 B1 | 7/2001 | Brodersen et al. |
| 6,272,487 B1 | 8/2001 | Beavin et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,505,188 B1 | 1/2003 | Ghazal et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,823,384 B1 * | 11/2004 | Wilson .................. H04L 29/06 379/265.02 |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,007,006 B2 | 2/2006 | Zilio et al. |
| 7,340,411 B2 | 3/2008 | Cook |
| 7,499,907 B2 | 3/2009 | Brown et al. |
| 7,526,469 B2 | 4/2009 | Narita et al. |
| 7,620,655 B2 | 11/2009 | Larsson et al. |
| 7,779,039 B2 * | 8/2010 | Weissman ......... G06F 17/30595 707/793 |
| 7,962,521 B2 | 6/2011 | Brown et al. |
| 8,359,325 B1 | 1/2013 | Gui et al. |
| 8,396,860 B1 | 3/2013 | Ramesh et al. |
| 8,510,290 B1 | 8/2013 | Brown et al. |
| 8,768,959 B1 | 7/2014 | Annapragada et al. |
| 8,868,404 B1 | 10/2014 | Yancey et al. |
| 9,081,805 B1 * | 7/2015 | Stamen ............. G06F 17/30297 |
| 9,146,984 B1 | 9/2015 | Bozkaya et al. |
| 9,336,272 B1 | 5/2016 | Thombre et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0078015 A1 | 6/2002 | Ponnekanti |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0061244 A1 | 3/2003 | Hirohata |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0088579 A1 | 5/2003 | Brown et al. |
| 2003/0093408 A1 | 5/2003 | Brown et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229639 A1 | 12/2003 | Carlson et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0117355 A1 | 6/2004 | Lef et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0163136 A1 * | 7/2005 | Chiu .................. H04M 3/4938 370/401 |
| 2005/0203940 A1 | 9/2005 | Farrar et al. |
| 2005/0223022 A1 * | 10/2005 | Weissman ......... G06F 17/30595 |
| 2005/0289102 A1 | 12/2005 | Das et al. |
| 2006/0023945 A1 | 2/2006 | King et al. |
| 2006/0136368 A1 | 6/2006 | Young-Lai et al. |
| 2006/0167865 A1 | 7/2006 | Andrei |
| 2006/0235831 A1 * | 10/2006 | Adinolfi .................. G06Q 40/00 |
| 2007/0027860 A1 | 2/2007 | Bestgen et al. |
| 2007/0073761 A1 | 3/2007 | Anderson et al. |
| 2007/0124276 A1 | 5/2007 | Weissman et al. |
| 2007/0136386 A1 | 6/2007 | Burger |
| 2007/0226186 A1 | 9/2007 | Ewen et al. |
| 2007/0271268 A1 * | 11/2007 | Fontoura et al. .................. 707/6 |
| 2008/0005092 A1 | 1/2008 | Kleewein et al. |

(56) References Cited

U.S. PATENT DOCUMENTS

| | | | |
|---|---|---|---|
| 2008/0040320 A1 | 2/2008 | Dettinger et al. | |
| 2008/0052271 A1 | 2/2008 | Lam | |
| 2008/0168058 A1 | 7/2008 | Gordon | |
| 2008/0177697 A1 | 7/2008 | Barsness et al. | |
| 2009/0019001 A1 | 1/2009 | Thiyagarajan et al. | |
| 2009/0049288 A1 | 2/2009 | Weissman | |
| 2009/0055439 A1 | 2/2009 | Pai et al. | |
| 2009/0070313 A1 | 3/2009 | Beyer et al. | |
| 2009/0182592 A1* | 7/2009 | Ballaro | G06Q 10/087 705/26.81 |
| 2009/0282045 A1* | 11/2009 | Hsieh et al. | 707/9 |
| 2010/0005054 A1 | 1/2010 | Smith et al. | |
| 2010/0005055 A1 | 1/2010 | An et al. | |
| 2010/0036801 A1 | 2/2010 | Pirvali et al. | |
| 2010/0057796 A1 | 3/2010 | Brown et al. | |
| 2010/0088311 A1 | 4/2010 | Fosse et al. | |
| 2010/0114976 A1 | 5/2010 | Castellanos et al. | |
| 2010/0121868 A1 | 5/2010 | Biannie et al. | |
| 2010/0169354 A1* | 7/2010 | Baby et al. | 707/765 |
| 2010/0174701 A1 | 7/2010 | Burger | |
| 2010/0250504 A1 | 9/2010 | Balasubramanian et al. | |
| 2010/0262593 A1 | 10/2010 | Bruno et al. | |
| 2010/0287206 A1 | 11/2010 | Cain et al. | |
| 2010/0287214 A1 | 11/2010 | Narasayya et al. | |
| 2011/0010394 A1* | 1/2011 | Carew et al. | 707/793 |
| 2011/0040744 A1 | 2/2011 | Haas et al. | |
| 2011/0055201 A1 | 3/2011 | Burger | |
| 2011/0258179 A1 | 10/2011 | Weissman et al. | |
| 2011/0282839 A1 | 11/2011 | Paksoy et al. | |
| 2012/0233147 A1 | 9/2012 | Solheim et al. | |
| 2013/0086038 A1 | 4/2013 | Perry | |
| 2013/0124500 A1 | 5/2013 | Beavin et al. | |
| 2013/0173590 A1 | 7/2013 | Ghazal | |
| 2013/0232133 A1 | 9/2013 | Al-Omari et al. | |
| 2013/0254210 A1 | 9/2013 | Morris et al. | |
| 2014/0188532 A1 | 7/2014 | Liu et al. | |
| 2015/0112965 A1 | 4/2015 | Tokuda et al. | |

OTHER PUBLICATIONS

Final Office Action for U.S. Appl. No. 14/028,316 dated Oct. 21, 2015, 26 pages.
Non-Final Office Action for U.S. Appl. No. 14/028,316 dated Aug. 10, 2017, 23 pages.
Non-Final Office Action for U.S. Appl. No. 14/028,316 dated Jun. 17, 2015, 21 pages.
Non-Final Office Action for U.S. Appl. No. 14/028,316 dated Nov. 3, 2016, 24 pages.
A Method and System to Enhance Query Performance by Autonomically Creating and Deleting Database Indices at Runtime. IBM. Published Sep. 24, 2003. IP.com Number IPCOM000019661D.
Corrected Notice of Allowability for U.S. Appl. No. 13/549,306 dated Sep. 14, 2018, 5 pages.
Final Office Action for U.S. Appl. No. 13/549,306 dated Nov. 13, 2013, 17 pages.
Final Office Action for U.S. Appl. No. 13/549,306 dated Nov. 7, 2014, 25 pages.
Final Office Action for U.S. Appl. No. 13/549,306 dated Sep. 26, 2016, 28 pages.
He, Hong. "Applications deployment on the Saas platform" In Pervasive Computing and Applications (ICPCA), 201 O 5th International Conference on, pp. 232-237. IEEE, 2010.
Hui, Mei, Dawei Jiang, Guoliang Li, and Yuan Zhou. "Supporting database applications as a service." In Data Engineering, 2009. ICDE'09. IEEE 25th International Conference on, pp. 832-843. IEEE, 2009.
Non-Final Office Action for U.S. Appl. No. 12/971,978 dated Jan. 14, 2013, 17 pages.
Non-Final Office Action for U.S. Appl. No. 13/549,306 dated Jun. 16, 2014, 23 pages.
Non-Final Office Action for U.S. Appl. No. 13/549,306 dated Jun. 24, 2013, 15 pages.
Non-Final Office Action for U.S. Appl. No. 13/549,306 dated May 20, 2016, 22 pages.
Notice of Allowance for U.S. Appl. No. 12/971,978 dated Jul. 8, 2013, 11 pages.
Notice of Allowance for U.S. Appl. No. 13/549,306 dated Jun. 1, 2018, 9 pages.
Notice of Allowance for U.S. Appl. No. 13/549,306 dated Nov. 20, 2017, 8 pages.
Tovarnak, Daniel, and Toma Pitner. "Towards multi-tenant and interoperable monitoring of virtual machines in cloud." In Symbolic and Numeric Algorithms for Scientific Computing (SYNASC), 2012 14th International Symposium on, pp. 436-442. IEEE, 2012.
Notice of Allowance for U.S. Appl. No. 14/028,316 dated Aug. 8, 2018, 8 pages.

* cited by examiner

FIG. 2

Custom_field_definition

| Custom_field_defn_id | Org_id | table name or id | field name | field data name | is_indexed | column-number |
|---|---|---|---|---|---|---|
| 210 | 220 | 230 | 240 | 250 | 260 | 270 |

| tenant_id | email_id | to_address | from_address | date | subject | body | size | status |
|---|---|---|---|---|---|---|---|---|
| 1 | 1 | jesse@email.com | a@yahoo.com | 1/1/2010 | Meeting | blah blah blah.... | 342 | 0 |
| 2 | 2 | someone@othercompany.com | b@yahoo.com | 1/17/2010 | news | blah blah blah.... | 342 | 0 |
| 3 | 3 | jim@news.com | c@yahoo.com | 2/20/2010 | news | blah blah blah.... | 342 | 0 |
| 1 | 4 | jesse@email.com | d@yahoo.com | 6/6/2009 | birthday | blah blah blah.... | 342 | 0 |
| 1 | 5 | jesse@email.com | e@yahoo.com | 5/5/2010 | discount | blah blah blah.... | 342 | 0 |
| 2 | 6 | someone@othercompany.com | f@yahoo.com | 7/4/2009 | hello | blah blah blah.... | 342 | 0 |
| 1 | 7 | jesse@email.com | g@yahoo.com | 1/3/2010 | big customer | blah blah blah.... | 342 | 0 |
| 1 | 8 | jane@email.com | h@yahoo.com | 3/4/2010 | meeting | blah blah blah.... | 342 | 0 |
| 1 | 9 | jesse@email.com | i@yahoo.com | 4/1/2009 | meeting | blah blah blah.... | 342 | 0 |

*FIG. 4A*

| tenant_id 401 | entity 404 | index number 406 | val1 432 | val2 452 | primary key 422 |
|---|---|---|---|---|---|
| 1 | email | 2 | jane@email.com | 3/4/2010 | 8 |
| 1 | email | 2 | jesse@email.com | 1/3/2009 | 7 |
| 1 | email | 2 | jesse@email.com | 4/1/2009 | 9 |
| 1 | email | 2 | jesse@email.com | 6/6/2009 | 4 |
| 1 | email | 2 | jesse@email.com | 1/1/2010 | 1 |
| 2 | email | 2 | jim@news.com | 5/5/2010 | 5 |
| 2 | email | 2 | someone@othercompany.com | 2/20/2010 | 3 |
| 2 | email | 2 | someone@othercompany.com | 7/4/2009 | 6 |
| 3 | email | 2 | | 1/17/2010 | 2 |

FIG. 4B

| tenant_id | entity | index number | val1 | val2 | primary key |
|---|---|---|---|---|---|
| 1 | email | 2 | jane@email.com | 3/4/2010 | 8 |
| 1 | email | 2 | jesse@email.com | 1/3/2009 | 1 |
| 1 | email | 2 | jesse@email.com | 4/1/2009 | 4 |
| 1 | email | 2 | jesse@email.com | 6/6/2009 | 5 |
| 1 | email | 2 | jesse@email.com | 1/1/2010 | 7 |
| 1 | email | 2 | jesse@email.com | 5/5/2010 | 9 |
| 2 | email | 2 | jim@news.com | 2/20/2010 | 3 |
| 2 | email | 2 | someone@othercompany.com | 7/4/2009 | 2 |
| 3 | email | 2 | someone@othercompany.com | 1/17/2010 | 6 |

*FIG. 5A*

| tenant_id | entity | index number | val1 | val2 | primary key |
|---|---|---|---|---|---|
| 1 | email | 2 | jesse@email.com | 5/5/2010 | 9 |

*FIG. 5B*

| tenant_id | email_id | to_address | from_address | date | subject | body | size | status |
|---|---|---|---|---|---|---|---|---|
| 1 | 5 | jesse@email.com | e@yahoo.com | 5/5/2010 | discount | blah blah blah.... | 342 | 0 |

*FIG. 5C*

METHODS AND SYSTEMS FOR PROVIDING MULTIPLE COLUMN CUSTOM INDEXES IN A MULTI-TENANT DATABASE ENVIRONMENT

CLAIM OF PRIORITY

This application claims the benefit of U.S. Provisional Patent Application 61/345,883 entitled Methods And Systems For Providing Custom Indexes In A Multi-Tenant Database Environment, by Jesse Collins et al., filed May 18, 2010, the entire contents of which are incorporated herein by reference.

CROSS REFERENCE TO RELATED APPLICATIONS

The following commonly owned, co-pending United States patent application, including the present application, are related to each other and is incorporated by reference herein in its entirety, U.S. patent application Ser. No. 10/817,161 entitled CUSTOM ENTITIES AND FIELDS IN A MULTI-TENANT DATABASE SYSTEM, by Weissman et al., filed Apr. 2, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to providing custom indexes in a multi-tenant database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

In multi-tenant database systems, such as the salesforce.com service, a multi-tenant architecture is used wherein customer organizations (i.e., tenants) share database resources in one logical database. The database tables themselves are typically shared; each entity in the data model typically contains an organization_id column that distinguishes rows for each tenant. All queries and data manipulation are performed in the context of a tenant filter on this (indexed) organization_id column to ensure proper security and the appearance of virtual private databases. In the salesforce.com system, for example, this strategy is used to expose standard entities such as Account, Contact, Lead, and Opportunity entities to customers.

However, customers may wish to add their own custom data to the database system in addition to the standard entities and fields provided with the standard application. In a traditional client/server application, where the customer has its own physical database, adding custom data is typically done via DDL (data definition language) against that database to create new physical schema—tables and columns. In an online multi-tenant database system, such as the salesforce.com service, this approach may be untenable for various reasons. For example, for a database system with a large population of tenants (e.g., on the order of 1,000 or 10,000 or more tenants), the union of all desired schema would overwhelm the underlying data dictionary catalog (e.g., Oracle dictionary). Additionally, the maintenance of all of these schema objects would be a nearly impossible burden for DBAs (database administrators). Further, current relational databases do not support online DDL (in a highly concurrent transactional system) well enough for organizations to remain logically independent. Specifically, the creation of schema by one organization could lock the application for all other customers causing unacceptable delays.

To allow custom data to be supported by a single multi-tenant database system standard objects, such as tables may be provided for use by multiple tenants or organizations. Each organization may add or define custom fields for inclusion in a standard object. Custom fields for multiple tenants may be stored in a single field within the object data structure, and this single field may contain different data types for each tenant. Indexing columns may also be provided, wherein a tenant may designate a field for indexing. Data values for designated fields are copied to an index column, and each index column may include multiple data types. Each organization may also define custom objects including custom fields and indexing columns.

Unfortunately, a table that defines custom fields might process a query relatively slowly if, for example, a query contains more than one parameter for searching or sorting. Such a query may execute by scanning hundreds or thousands of rows to find the second parameter and perform filtering or sorting operations.

BRIEF SUMMARY

In accordance with embodiments, there are provided methods and systems for providing multiple column custom indexes in a multi-tenant database environment. A method embodiment provides defining a multi-tenant data structure having a plurality of data columns data fields and a plurality of rows for each of multiple tenants, each row including a data column for a tenant identifier, defining a first data field for a tenant, the first data field having a first data type, defining a second data field for the tenant, the second field having a second data type, and defining an index table including a tenant identifier for the tenant, a copy of data from the first data field and the second data field, and a key to the corresponding rows of the multi-tenant data structure.

While the present invention is described with reference to an embodiment in which techniques for providing custom indexes in a multi-tenant database environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 2 illustrates a custom field definition metadata table in an embodiment;

FIG. 4A illustrates an example of data represented in a standard main table for e-mail records in an embodiment;

FIG. 4B illustrates an example of custom two column index table for the data of the example of FIG. 4A in an embodiment;

FIG. 5A illustrates the application of a query to the index table of FIG. 4B in an embodiment;

FIG. 5B illustrates a result of the application of a query to the index table as illustrated in FIG. 5A in an embodiment;

FIG. 5C indicates a result read from a main table using a primary key from the result of FIG. 5B in an embodiment;

DETAILED DESCRIPTION

General Overview

Figure 1:
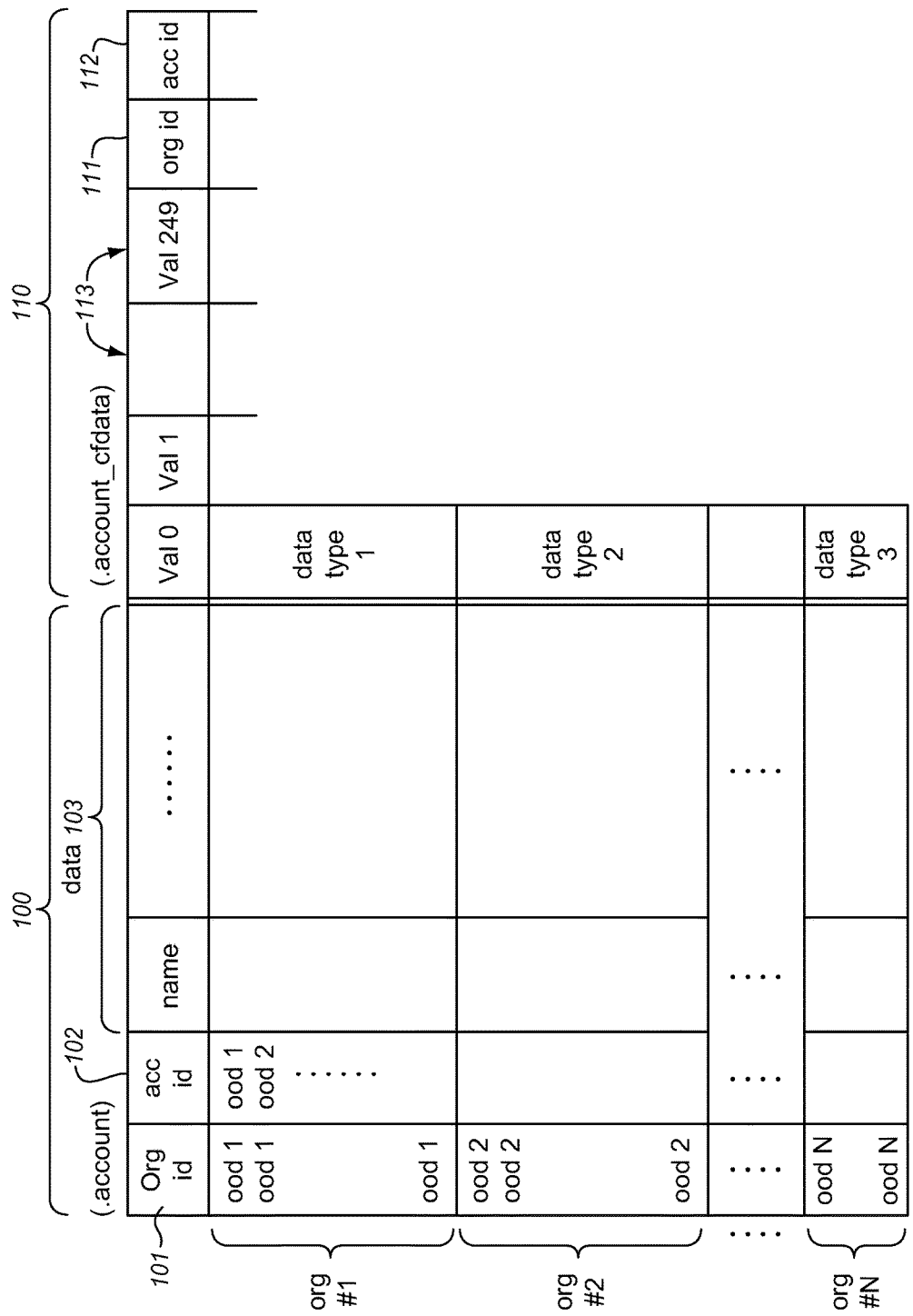
FIG. 1 illustrates an example of objects represented as a standard main table and an associated custom field table in an embodiment.

Methods and systems are provided for providing custom indexes in a multi-tenant database environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

A multi-tenant database client may desire to run frequent API (Application Programming Interface) queries with a filter on one column and a sort on another column, returning just the first few rows or, for example, only new rows. Such a query might traditionally need to scan 1000 rows or more and sort the data on each query to find the first few rows.

One way to avoid sorting or scanning all of the rows is to use a composite standard database index. This avoids a second sorting operation, but may introduce a large maintenance overhead in a multitenant system because the index must be maintained for all tenants' data. Another way is to join more than one custom index together for purposes of executing the query; however this will still require a sort operation because sort ordering is generally not preserved when two indexes are joined together. However, related lists with sorts can be slow when a parent object has many related child objects. Queries that sort through related lists can also use a sort and rownum (number of rows to sort) limit to reduce the delay, but this can affect the result.

To answer such queries efficiently, a two column custom index can be used. In one embodiment, platform objects, such as tables with rows and columns, are provided that give list views with filters on a first parameter, for example CommunityId and sorts on a second parameter, such as date or score. The second column may be used for dependencies, cascade deletes, or any other useful parameters. Two column custom indexes, as explained below, may be more efficient than composite indexes and custom index joins for evaluating filters on two parameters because the index ordering may be used in order to avoid a sort operation.

In one embodiment, the two column custom index definitions may be stored in the existing custom_index table in a field2_enum_or_id column. In another embodiment, the data for two column custom indexes may be stored in new tables such as a "core.cust_idx_value_string_num" table. There may be separate tables for each combination of value types.

Creating new tables allows the data to be divided among multiple tables so that for upgrade scripts, large data copies and exports, and other large scale operations, the custom index tables will be smaller. New tables may also avoid overhead in index storage when compared against an implementation with a single table and multiple data columns. Separate tables allows each row to be indexed only twice (a PK and a data value index) rather than once for each combination of data types. This reduces the total number of tables.

Next, mechanisms and methods for providing custom indexes in a multi-tenant database environment will be described with reference to example embodiments.

Custom Fields

According to one embodiment, for a table such as one for a standard entity, an additional set of two or more columns, e.g., 10, 100, or 250 columns, of text data are defined in the physical schema. These additional columns, also referred to herein as custom data columns, custom field columns or custom fields, allow a system administrator to define additional fields that are not included in the pre-defined standard fields for that entity. These custom fields preferably have a data-type of VARCHAR (variable length character). In one aspect, these custom fields are preferably stored out of row from the main entity table, although these fields may be stored in the main table. For example, if the main table is called "sales.account" then the custom field data might be stored in a table called "sales.account_cfdata" where "cf" stands for "custom field." Both of these tables preferably contain an organization_id column to distinguish tenant (organization) rows, as well as the same indexed primary key (e.g., account id, in this case) that identifies those rows throughout the database. Furthermore, both tables are preferably partitioned physically on the database (e.g., Oracle DB) to encourage parallelization, for example, when necessary to act on the entire table for maintenance purposes and to maintain shallower indexes.

FIG. 1 illustrates an example of objects represented as a main table 100 and an associated custom field table 110. In the specific example shown in FIG. 1, the main table 100 (.account) represents a standard Account entity and the custom field table 110 (.account_cfdata) includes the custom fields defined by the various organizations (tenants) using the main table 100. As shown, main table 100 includes an organization ID ("org id") column 101 and a table ID (e.g., "acc id" for .account id) column 102 that acts as the primary key for table 100. Data table 100 also includes a plurality of data columns 103.

In the specific example of FIG. 1, where the table represents a standard entity, data columns 103 are the predefined data columns, or standard fields, that are provided to the various organizations that might use the table. In the standard Account entity example, such standard fields might include a name column, a site column, a number of employees column and others as would be useful for storing account-related information. Each of the data columns 103 is preferably defined to store a single data type per column. The org id column 101 is provided to distinguish among organizations using the multi-tenant account table 100. As shown, N different organizations (org#1 to org#N) have data stored in table 100. The org ids in column 101 are preferably of the data type Char(15), but may include other data types. In one aspect, the first 3 characters of the org id are set to a predefined prefix, such as "00d", although another subset of characters in the org id may be used to hold such a prefix if desired.

Custom field table 110 similarly includes an org id column 111, a table id column 112 and a plurality of data columns 113. As above, table id column 112 acts as the primary key for table 110 and preferably includes the same values as table id column 102 of table 100. In the specific example shown, there are 250 data columns 113 labeled as val0, val1 . . . val249. It is appreciated that any other number may be used as desired, such as, for example, 10 or 100.

When an organization is created initially and associated with database table 100, the custom field columns 113 are empty for that organization. However, every time a record or row is created in the main table (e.g., account) a corresponding row is created in the custom field table—all custom field columns are Null, and therefore take up no space until used.

In one aspect, data is only allowed to enter these custom fields when a new "column" for the organization is defined, e.g., by the administrator for that organization. For example, in the Account entity example, it may be desirable for a specific organization to create one or more additional custom fields, in addition to the standard fields 103, to store specific types of data that may not be accounted for in the predefined standard fields. An organization can create additional custom columns for such data. Rather than defining a physical column (in Oracle, the definition of which would be placed in the Oracle dictionary catalog) a definition of the additional column is stored in metadata, e.g., in a metadata catalog, which may include one or more metadata tables. The definition of a physical column could likewise be stored in XML (eXtensible Markup Language) or some other format.

FIG. 2 illustrates an example of a custom field definition metadata table 200 ("custom_field_definition") according to an embodiment of the present invention. Custom field definition metadata table 200 is used to record the name, datatype and other information for each custom field column defined for each organization and table (e.g., standard tables and custom tables, which will be described in more detail below). As shown, metadata table 200 includes custom_field_definition_id column 210, organization_id column 220, table name or id column 230, field name column 240, field datatype column 250, is_indexed column 260 and a column_number column 270. Organization_id column 220 stores the org id of the organization for which the custom field is created, and the custom_field_definition_id column is the primary key for table 200.

Table name column 230 stores the names of standard entity tables, such as Account, or the id of custom entity tables created for an organization. Field name column 240 stores the text name of the custom field, and field datatype column 250 stores the data type for the custom field. Examples of data types include text, number, date, picklist, etc. A picklist data type is a text field where the value is chosen from an enumerated list of values. A picklist is typically displayed as a dropdown in the UI. Is_indexed column 260 stores a value indicating whether the field has been flagged for indexing, which will be described in more detail below. In one aspect, column 260 stores a boolean value. Column_number column 270 stores the column number (e.g., "val0") assigned to a custom field in custom field table 110 (FIG. 1).

The creation of a new custom field in the application allocates one of the custom field columns 113 to hold the data. In preferred aspects, the lowest numbered columns are filled first. For example, as shown in FIG. 1, the "val0" column is filled first and then the "val1" column and so on for each organization. Therefore, depending on the number of custom columns defined by an organization, each custom field 113 may or may not contain data for an organization. Now, when users of the application in an organization edit rows for that table, the new custom field appears on the screen (or via the API), which will appear the same as all the other standard fields. However, when this data is persisted in the database, the value of the custom field is stored in the designated custom field column in the separate custom field table 110, instead of in the standard main table 100.

In one aspect, a variety of virtual data-types are allowed for these custom fields even though the underlying physical storage may be character based. When the organization's system administrator defines numeric or date custom field types, for instance, then the values are stored as text in a canonical format that allows easy conversion back to the logical data-type. As mentioned earlier, in one aspect, a data type of VARCHAR is preferably used. For instance, in this aspect, dates are stored in the YYYYMMDD format—which allows for conversion via the TO_DATE(<column>, 'YYYYMMDD') function and also allows for proper sorting without doing any conversion. For numbers, the usual decimal format is used, and the Oracle function TO_NUMBER( ) may be used to convert back to numeric values for sorting, mathematical operations, and filtering, etc.

Figure 3:
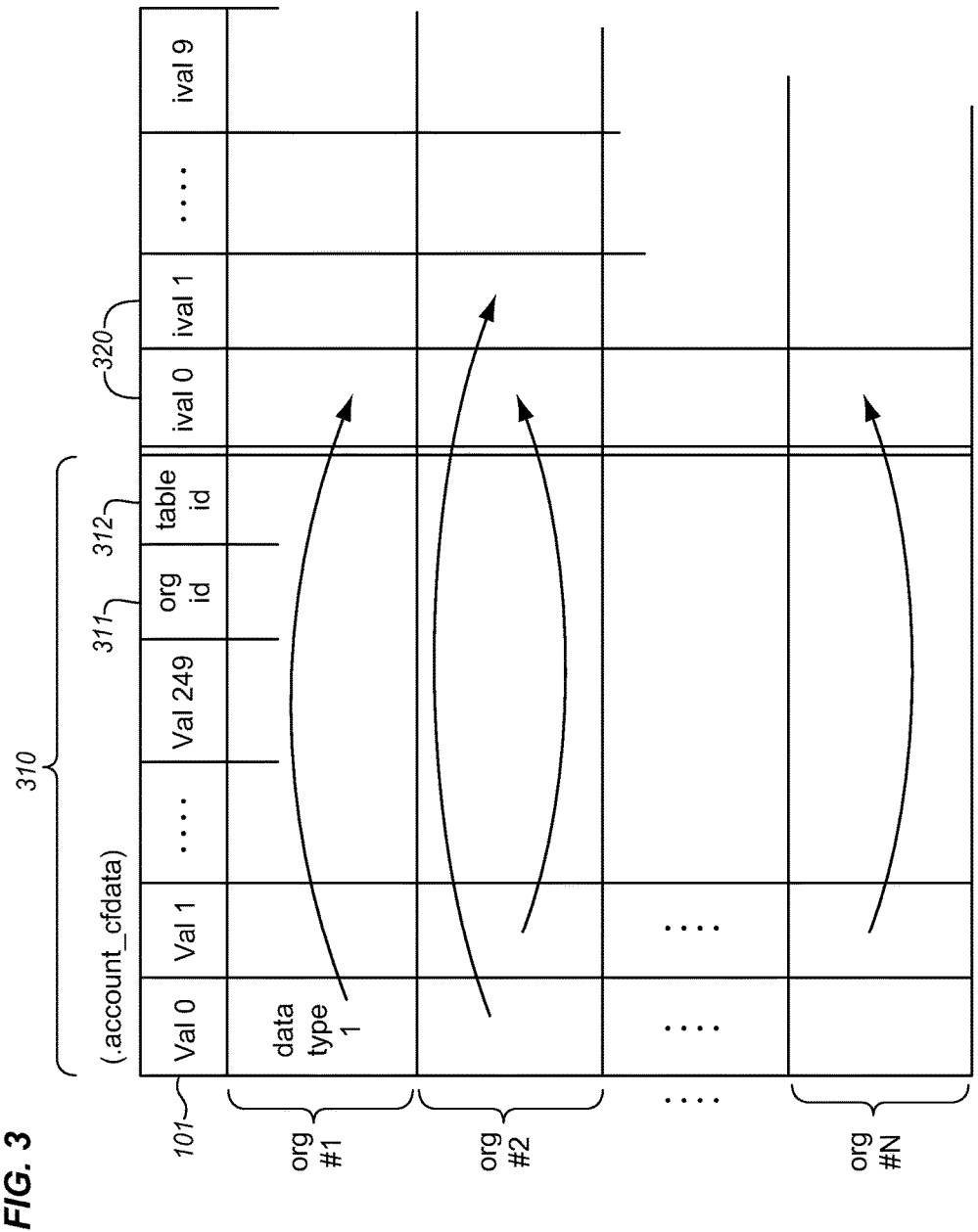
FIG. 3 illustrates a custom object represented as a custom field table including physical index columns in an embodiment.

Because the database is multi-tenant, a given physical custom field column may contain data across multiple organizations. For example, because an organization is not limited to specific data types, one organization may define one data type such as a date and another organization may define a different data type such as a string or a number. Therefore it is likely that strings, numbers, and dates will all be found in one physical custom field column. FIG. 1 illustrates an example of a custom field column containing different data types. As shown in the "val0" custom column, for example, the custom column data type defined by organization 1 is data type 1, the custom column data type defined by organization 2 is data type 2, and the custom column data type defined by organization N is data type 3. Data types 1, 2 and 3 may be the same or they may be different. For example, data type 1 may be text, data type 2 may be date, and data type 3 may be number. FIG. 3, and the related discussion below, illustrates an example where different data types are mixed in a custom field column. In one aspect, a separate pool of columns is provided for custom fields of different data types, i.e., each of the custom field columns in the separate pool contains a single data type.

In one embodiment, metadata is used to determine the data type(s) in a given custom field column. That is, metadata is used to track the logical data type for each organization in each custom column. In one aspect, a mapping function is created from the metadata. For example, when an organization defines a custom field for a standard entity, a custom field definition is stored in metadata table 200 including the organization id for that organization, the table name (e.g., .account_cfdata) and the column number assigned in the custom table (e.g., val0). In this manner, the data type(s) in any custom column can be determined for efficient data retrieval given the column number, table name and organization id.

Custom Field Indexing

Now consider the problem of indexing the data in these custom field columns (e.g., columns 113) to allow for fast retrieval. For example, users expect to filter on date values as dates and numeric values as numbers. However, in order for these filters to work efficiently, given the expressions above used to convert their values, it would be necessary to place a functional index (e.g., an Oracle DB functional index) on each organization's slice of the data in a given custom field column. This is not possible from the Oracle DB perspective because the Oracle DB does not understand that one physical column contains data in multiple formats. For example, if one tries to create an index on the TO_DATE or TO_NUMBER expressions above, an error would result since other textual values in that physical column would not conform to the desired format.

Similarly, when searching on string data, users expect case insensitive searches. That is, searching for "car" should find "CAR" or "CaR." However, the definition of case insensitive is language dependent, and a service (e.g., CRM service) using such a multi-tenant database structure may be multi-language enabled. To search properly on multi-language data requires the use of a functional index built using various NLS (natural language standards) functions in Oracle. Since a given physical column could contain data in multiple languages it would be necessary to build N different indexes for each of the languages supported which would result in a non-scalable solution.

For the reasons listed above, among others, such "Indexed Custom Fields" are implemented in one embodiment by storing data in a separate set of indexed columns. According to one embodiment of the present invention, a plurality of additional index columns are provided to allow for indexing custom fields. When a custom field is flagged for indexing by a database administrator, one of the plurality of index columns is allocated to that flagged column. Data from the flagged column is copied to the allocated index column. The data is stored in the index column in a format that facilitates searching, e.g., for dates and strings. For example, the YYYYMMDD is itself a searchable format as strings in that format can be compared lexically using normal string comparison.

FIG. 3 illustrates an example of a custom object represented as a custom field table 310 including physical index columns 320 according to one embodiment. In one aspect, each custom field data table contains multiple (e.g., 10, 100, 250, etc.) physically indexed columns 320, e.g., using standard Oracle B*Tree indexes. In an example with 10 indexed columns, an administrator can therefore designate up to 10 custom fields, of string or date types, to be indexed. When a custom field is flagged for indexing, the data in the original column (which is still maintained to display the unmodified format to the user when necessary) is copied to one of these indexed columns. For example, as shown in FIG. 3, custom data field "val0" was flagged by the system administrator for organization 1 as an indexed custom column. Data from this flagged column is copied to the index column "ival0". Similarly, custom data field "val1" was flagged by the system administrator for organization 2 as an indexed custom column, and the data from this flagged column is copied to index column "ival0". At some later time, the system administrator for organization 2 may have flagged another custom field column and the data for this column is copied to another index column (e.g., column "val0" data copied to column "ival1" as shown in FIG. 3). In one aspect, similar to the custom fields, the lowest numbered index columns are preferably used or filled first.

In one aspect, to avoid the problem with searching across multiple languages, a "case folding" algorithm is implemented (e.g., in an application server) that converts each string custom field value to a universal case insensitive format. One such case folding algorithm is an algorithm defined by the Unicode Consortium in the Unicode 4.0 standard, section 3.13—Caseless Matching (http://www.unicode.org/versions/Unicode4-.0.0/ch03.pdf), hereby incorporated by reference, which is a tabular lookup function that converts characters to a form that is binary comparable independent of case for all languages that have a concept of case. Whenever values in the original custom field column are searched, the SQL instead filters on the corresponding case-folded indexed column after performing the same case folding operation on the literal being searched. Dates need not be modified from their YYYYMMDD format, which is also included in the index (unmodified) as text.

Organizations that choose not to use indexed custom fields will have null values in these fields, and Nulls do not take up any space in the indexes. In this manner space is used up in the database only as custom columns are actually indexed. Also, index columns 320 are preferably stored in the corresponding custom field table, however, they may be stored out of row, in which case it is preferred that the org id 311 and table id 312 columns be copied to the separate indexed column table to facilitate searching.

Two-Column Custom Index

According to one embodiment of the invention, a custom field column or a standard column of a multi-tenant or single tenant database may have multiple two column custom indexes. The two index columns may be different to provide new functionality for index columns in accessing the data. The two different columns can be used in many different combinations, depending on the structure of the data and the anticipated queries into the data. For sorting purposes or to speed data access, one of the columns may be a date or time, a magnitude, a dollar amount, or a location. In another example, one of the columns of a two column custom index is a foreign key, for optimization of related lists and for a CommunityId field.

When such two column custom indexes are widespread, they may also be used as a structure even if the index only uses one of the two columns. In such a case, a two column indexes may include at least some null values. This allows for cases when one column is null but the other column is not.

In a further extension, both columns can be null. This corresponds to rows that are not being used. This preserves the structure and reserves a capability to add indexes with one or two columns later. These rows can be excluded from any queries or other use where the values for both rows values are null. Certain types of queries could also be enhanced by excluding rows where the first index column, or in a different configuration, the second index column, is null. The single column indexes in the two-column structure may not be useful for filters on the leading column. This would prevent the second column index to be used on such a filter. Such indexes would still require some overhead processing to update the columns that are not null. In one embodiment, the index tables are separate custom tables and are not created unless the data is to be indexed.

A double column index provides additional possibilities for finding data and running queries. One such new possibility is a sort based on both columns of the index. If there is a low row number limit (rownum limit) and the sort ordering requested by the query matches the ordering of the index, then the needed (small) number of rows can be returned quickly and in order, without the need for a database sort operation or to scan any additional rows. In another example, the first column can be used as a filter and the second column can be used as a sort. Alternatively after a sort on the first column, there may be a filter on the second column, or the index may be used to evaluate filters on both the first and second columns.

The two-column index is explained below in the context of a particular example. FIG. 4A shows an example simple data set in a table similar to the generalized table of FIG. 1. In this FIG. a set of e-mails are represented using custom fields. However, depending on the application e-mail data may be a standard, not a custom field.

In this example, an identifying column 401 provides an identification of the tenant for which e-mails have been stored in the database. This general information column 401 may be supplemented with additional columns providing keys, account information, pointers to other identifiers, etc., depending on the application. The custom field columns 410 provide information about the e-mails. The particular columns shown are for illustration purposes. More or fewer columns may be used depending on the nature of the e-mail system and the level of record-keeping that is desired.

In the present example, email_id 420, provides a unique identifier for each row. to_address 430 provides the destination of the e-mail message for each row. The same or additional columns may be used for additional addressees, when appropriate. from_address 440 provides the source for each row date 450 provides the data that the message was sent. More accurate timing information may be stored in the same or additional column if desired. subject 460 and body 470 are taken directly from the text of the e-mail size 480 and status 490 provide statistical information about the e-mail.

FIG. 4B provides an example of how one aspect of the e-mail table may be indexed. The particular columns to be indexed can be selected to suit the particular custom fields and the preferences of a particular tenant, customer, organization or user. The index table reproduces some of the fields in the main data table of FIG. 4A. The tenant_id column 401 is carried over from the data table. The entity column 404 identifies the table that is indexed as the e-mail table or the e-mail portion of a set of custom fields. The index number column 406 provides the index number and the primary key column 422 provides a key to the email_id column 420 of the e-mail table. The table also has two data rows, val1 432 and val2 452. The first index column corresponds to the to_address 430 and the second value corresponds to the date 450 of the e-mail table.

The index table, not only provides an index into the data but can also be sorted, based on any one or more particular fields. In the example of FIG. 4B, the table is sorted by tenant id, then by entity, then by index number, then by val1, and then by val2. This cannot be seen in the sort order of such a small set of data, however, it can be seen that the table is sorted by tenant id and by val1, the first index column. As a result, for any particular tenant, a query can go directly to the relevant portion of the index table. Additional index tables may be provided that are sorted based on any of the other columns in any sort order in order to enhance the speed with which other queries may be performed using an index table.

FIGS. 5A-5C show how e-mail data might be looked up using a query and the index table. Typically, using a single column index, a query would first go to a single column index table. Consider, for example, that the query is for the most recent e-mail from "jesse@email.com." In this case, the query can a) look up the rows corresponding to tenant 1 in the index table, b) identify those rows for index number 1, and c) identify those rows where the index value is jesse@email.com. If the index table is designed for such queries, then these rows will be sorted in this order and the desired rows will be next to each other. The query can then d) use the primary keys for the identified rows to access the main database and read out the desired data.

The database data can then be e) sorted by date and f) the most recent row can be identified as the result of the query. Such a process provides a result for a query for the most recent e-mail for "jesse@email.com." In this process every e-mail for "jesse@email.com" was accessed in the main database must be accessed in the main database table.

In the example beginning with FIG. 5A, there are two indexed columns and the index table is sorted based on both indexes. To answer the same query, the query can a) look up the rows corresponding to tenant 1 in the index table, b) identify the rows for index number 1 in the index table, c) identify the rows where "jesse@email.com" is the first index value in the index table, and d) identify the last row which, based on the sort order, has the most recent date. The identified row from the index table is shown in FIG. 5B. This row identifies the data in the main database but does not contain all of the desired data.

The query can then take the primary key "9" for the identified row and e) read that row from the database. An example portion of the data for this row is shown as FIG. 5C. This is the extracted data from the main database. In this example, with the two column index table, the query accesses only a single row from the database, instead of five rows. In addition, the query does not sort the rows from the database, but uses the pre-sorted index table values to perform the same function. As a result, the query can be processed faster and less access to the main database is required to answer the same query.

System Overview

Figure 6:
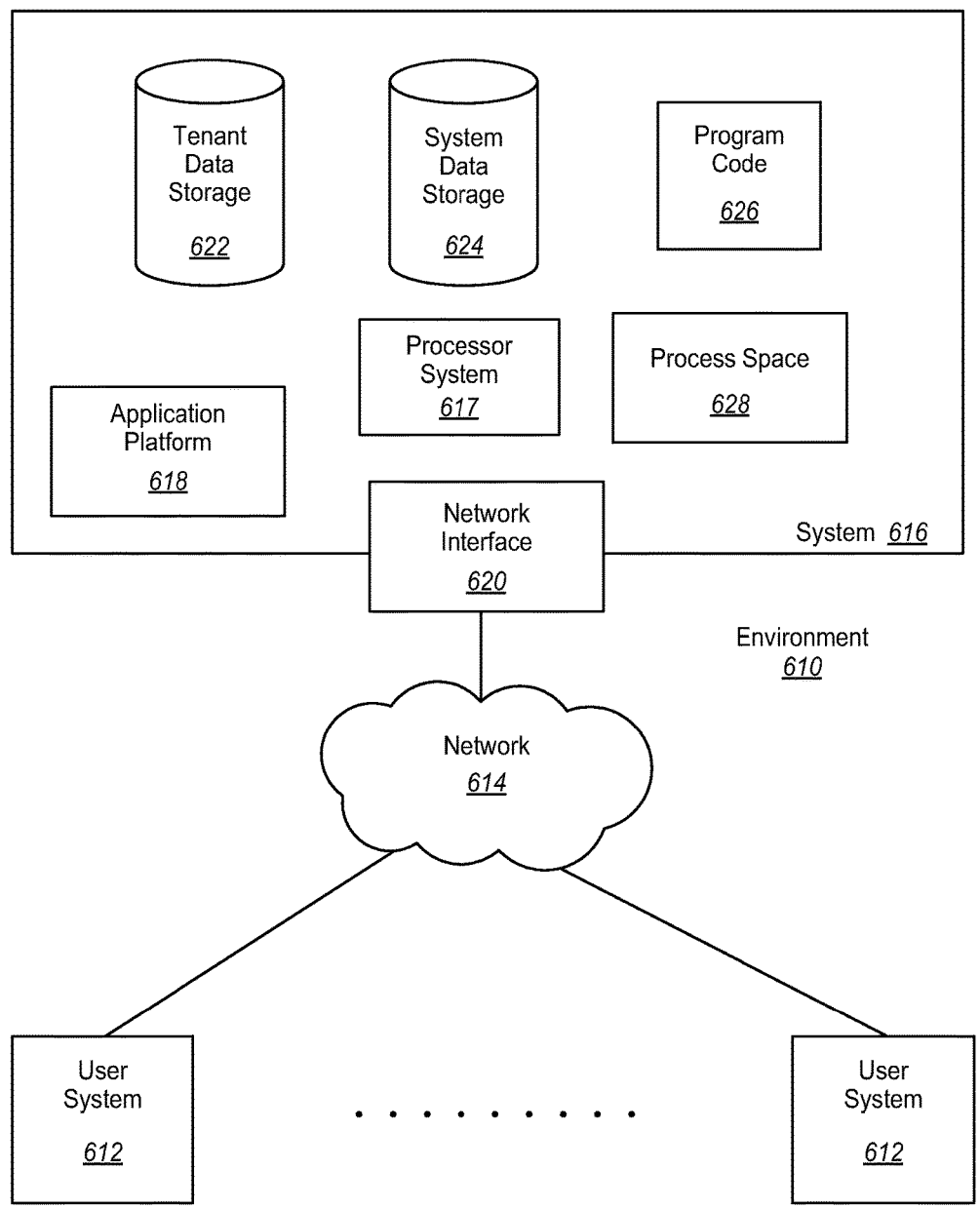
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP)

enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
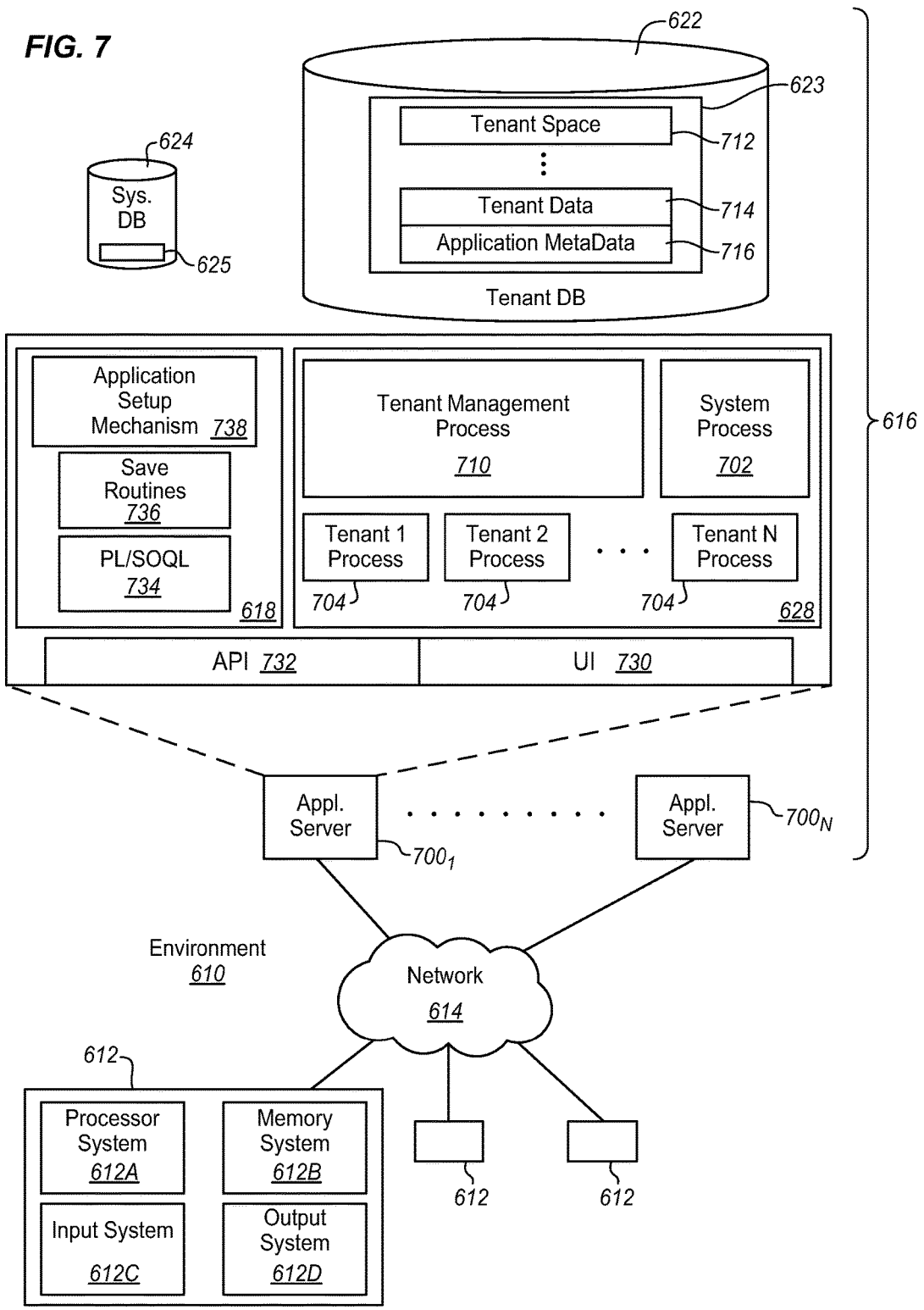
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 10001-1000N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT DATABASE ON-DEMAND DATABASE SERVICE issued Jun. 1, 2010 to Craig Weissman, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A database system-implemented method for providing custom indexes in a multi-tenant database environment, the method comprising:

reducing, by a custom index computing device, sorting and scanning operations involving data columns and rows during query executions for multiple tenants within the multi-tenant database environment using a multi-tenant data structure having a primary table, wherein the multi-tenant database environment includes the custom index computing device having one or more processing devices and associated memory devices, and a multi-tenant database system coupled to the custom index computing device, wherein the multi-tenant database system includes one or more database storing the multi-tenant data structure and having data resources shared by the multiple tenants, wherein reducing comprises:

maintaining, by the custom index computing device, a first column and a second column in the primary table of the multi-tenant data structure stored at the multi-tenant database system, wherein maintaining includes defining a first data field for a first data type associated with the first column, and a second data field for a second data type associated with the second column, wherein the first column corresponds to first data of the first data type corresponding to a first tenant of multiple tenants within the multi-tenant environment, wherein the second column corresponds to second data of the second data type corresponding to a second tenant of the multiple tenants;

maintaining, by the custom index computing device, custom fields in the custom field table of the multi-tenant data structure stored at the multi-tenant database system, wherein maintaining includes assigning tenant-defined indexing to the custom fields such that the custom fields offer tenant-defined indexing of the first and second data persisting in the database;

maintaining, by the custom index computing device, the index table separate from and associated with the primary table, wherein maintaining includes assigning a tenant identifier of the first tenant and a second tenant identifier of the second tenant to the index table, wherein the first tenant identifier and the second tenant identifier correspond to the first column and the second column, respectively, of the primary table;

sorting, by the custom index computing device, the index table based on the first column and the second column of the primary table, and the custom fields of the custom field table; and causing, by the custom index computing device, the sorted index table to be stored at one or more of the associated memory devices, wherein the key comprises a primary key, wherein the tenant-defined indexing of the data includes tenant-based designation for types of the data to be held by one or more of the custom fields or one or more of the data columns such that an entire data column is capable of representing a single data type, where the single data type includes one or more of a prefix, a suffix, a customer identification, a name, and a title.

2. The method of claim 1, wherein one of the first data field and the second data field indicates a time.

3. The method of claim 1, wherein the index table further comprises an index field.

4. The method of claim 1, wherein the index table comprises columns in the multi-tenant data structure.

5. The method of claim 1, wherein the index table is independent of the multi-tenant data structure.

6. The method of claim 1, further comprising applying a query to the index table to locate rows of the multi-tenant data structure using the sort order of the index table.

7. The method of claim 6, wherein applying further comprises looking up rows in the index table to identify a group of rows related to the query, using the sort order of the rows to select a desired group of rows, and applying the keys for the desired group of rows to read data from the multi-tenant data structure.

8. The method of claim 1, further comprising maintaining the index table by copying data from the multi-tenant data structure to the first and second data fields and sorting the rows of the index table using the copied data.

9. A non-transitory machine-readable medium having stored thereon instructions when executed by a processing device, cause the processing device to perform operations comprising:

reducing sorting and scanning operations involving data columns and rows during query executions for multiple tenants within a multi-tenant database environment using a multi-tenant data structure having a primary table, wherein the multi-tenant database environment includes the custom index computing device having one or more processing devices and associated memory devices and a multi-tenant database system coupled to the custom index computing device, wherein the multi-tenant database system includes one or more database storing the multi-tenant data structure and having data resources shared by the multiple tenants, wherein reducing comprises:

maintaining a first column and a second column in the primary table of the multi-tenant data structure stored at the multi-tenant database system, wherein maintaining includes defining a first data field for a first data type associated with the first column, and a second data field for a second data type associated with the second column, wherein the first column corresponds to first data of the first data type corresponding to a first tenant of multiple tenants within the multi-tenant, wherein the second column corresponds to second data of the second data type corresponding to a second tenant of the multiple tenants;

maintaining custom fields in the custom field table of the multi-tenant data structure stored at the multi-tenant database system, wherein maintaining includes assigning tenant-defined indexing to the custom fields such that the custom fields offer tenant-defined indexing of the first and second data persisting in the database;

maintaining the index table for each tenant separate from and associated with the primary table, wherein maintaining includes assigning a tenant identifier of the first tenant and a second tenant identifier of the second tenant to the index table, wherein the first tenant identifier and the second tenant identifier correspond to the first column and the second column, respectively, of the primary table;

sorting the index table based on the first column and the second column of the primary table and the custom fields of the custom field table; and causing the sorted index table to be stored at one or more of the associated memory devices, wherein the key comprises a primary key, wherein the tenant-defined indexing of the data includes tenant-based designation for types of the data to be held by one or more of the custom fields or one or more of the data columns such that an entire data column is capable of representing a single data type, where the single data type includes one or more of a prefix, a suffix, a customer identification, a name, and a title.

10. The machine-readable medium of claim 9, wherein the index table further comprises an index field.

11. The machine-readable medium of claim 9, wherein the index table comprises columns in the multi-tenant data structure.

12. The machine-readable medium of claim 9, wherein the index table is independent of the multi-tenant data structure.

13. The method of claim 1, further comprising defining a metadata catalog having at least one metadata table, the metadata of the table defining the data fields of the index table.

14. The method of claim 1, wherein values of the copy of data from at least one of the first data field and the second data field are converted to a different format to improve searching.

15. The method of claim 1, wherein the index table further includes additional fields that are not included in the primary table.

16. The machine-readable medium of claim 9, wherein the operations further comprise defining a metadata catalog having at least one metadata table, the metadata of the table defining the data fields of the index table, wherein values of the copy of data from at least one of the first data field and the second data field are converted to a different format to improve searching, wherein the index table further includes additional fields that are not included in the primary table.

17. A database system for providing custom indexes in a multi-tenant database environment having a custom index computing device having one or more processing devices and associated memory devices, the one or more processing devices to perform operations comprising:

reducing sorting and scanning operations involving data columns and rows during query executions for multiple tenants within a multi-tenant database environment using a multi-tenant data structure having a primary table, a custom field table, and an index table, wherein the multi-tenant database environment includes the custom index computing device having one or more processing devices and associated memory devices, and a multi-tenant database system coupled to the custom index computing device, wherein the multi-tenant database system includes one or more databases storing the multi-tenant data structure and having resources shared by the multiple tenants, wherein reducing comprises:

maintaining a first column and a second column in the primary table of the multi-tenant data structure stored at the multi-tenant database system, wherein maintaining includes defining a first data field for a first data type associated with the first column, and a second data field for a second data type associated with the second column, wherein the first column corresponds to first data of the first data type corresponding to a first tenant of multiple tenants within the multi-tenant, wherein the second column corresponds to second data of the second data type corresponding to a second tenant of the multiple tenants;

maintaining a second column in the custom field table of the multi-tenant data structure stored at the multi-tenant database system, wherein maintaining includes assigning tenant-defined indexing to the custom fields such that the custom fields offer tenant-defined indexing of the first and second data persisting in the database;

maintaining the index table for each tenant separate from and associated with the primary table, wherein maintaining includes assigning a tenant identifier of the first tenant and a second tenant identifier of the second tenant to the index table, wherein the first tenant identifier and the second tenant identifier correspond to the first column and the second column, respectively, of the primary table;

sorting the index table based on the first column and the second column of the primary table and the custom fields of the custom field table; and causing the sorted index table to be stored at one or more of the associated memory devices, wherein the key comprises a primary key, wherein one of the first data field and the second data field indicates a time, wherein the index table further comprises an index field, wherein the tenant-defined indexing of the data includes tenant-based designation for types of the data to be held by one or more of the custom fields or one or more of the data columns such that an entire data column is capable of representing a single data type, where the single data type includes one or more of a prefix, a suffix, a customer identification, a name, and a title.

18. The database system of claim 17, wherein the index table comprises columns in the multi-tenant data structure, wherein the index table is independent of the multi-tenant data structure.

19. The database system of claim 17, wherein the operations further comprise applying a query to the index table to locate rows of the multi-tenant data structure using the sort order of the index table, wherein applying further comprises looking up rows in the index table to identify a group of rows related to the query, using the sort order of the rows to select a desired group of rows, and applying the keys for the desired group of rows to read data from the multi-tenant data structure.

20. The database system of claim 17, wherein the operations further comprise maintaining the index table by copying data from the multi-tenant data structure to the first and second data fields and sorting the rows of the index table using the copied data.

* * * * *